US011892165B2

United States Patent
Nath et al.

(10) Patent No.: US 11,892,165 B2
(45) Date of Patent: Feb. 6, 2024

(54) HEAT SHIELD FOR FUEL NOZZLE

(71) Applicant: General Electric Company, Schenectady, NY (US)

(72) Inventors: Hiranya Nath, Karnataka (IN); Michael A. Benjamin, Cincinnati, OH (US); Rajendra Wankhade, Karnataka (IN); Hari Chandra, Karnataka (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/324,451

(22) Filed: May 19, 2021

(65) Prior Publication Data

US 2022/0372913 A1 Nov. 24, 2022

(51) Int. Cl.
*F23R 3/28* (2006.01)
*F02C 7/24* (2006.01)

(52) U.S. Cl.
CPC ................ *F23R 3/283* (2013.01); *F02C 7/24* (2013.01); *F23R 3/286* (2013.01); *F05D 2260/231* (2013.01)

(58) Field of Classification Search
CPC ........... F23R 3/283; F23R 3/343; F23R 3/286
See application file for complete search history.

(56) References Cited

U.S. PATENT DOCUMENTS 4,322,945 A 4/1982 Peterson et al.
4,934,145 A 6/1990 Zeisser
5,894,732 A 4/1999 Kwan
6,679,063 B2 1/2004 Ebel
10,072,845 B2 9/2018 Mook et al.
10,125,991 B2 11/2018 Ramier et al.
10,317,085 B2 6/2019 Hannwacker et al.
2009/0255120 A1* 10/2009 McMasters ............... F23R 3/14 29/428
2019/0056113 A1 2/2019 Mook et al.
2020/0025384 A1* 1/2020 Patel ....................... F23R 3/002
2020/0063963 A1* 2/2020 Bilse ......................... F23R 3/10
2020/0240326 A1* 7/2020 Miura ....................... F02C 3/04

* cited by examiner

*Primary Examiner* — Katheryn A Malatek
*Assistant Examiner* — Alyson Joan Harrington
(74) *Attorney, Agent, or Firm* — Venable LLP; Edward Kmett; Michele V. Frank

(57) ABSTRACT

A heat shield for a fuel nozzle of a gas turbine engine combustor. The heat shield includes a radial flange extending in radial and circumferential directions and has an opening therethrough at a radially inward end of the radial flange, and an annular conical wall extending in longitudinal and circumferential directions, the annular conical wall being connected to the radial flange at the radially inward end of the radial flange. The radial flange includes a flange forward side, and a flange aft side, and has a flange outer end portion. The flange outer end portion includes a flange rounded end portion on one of the flange forward side or the flange aft side, and a flange rounded protruding lip on the other of the flange forward side or the flange aft side, the rounded protruding lip extending in the longitudinal direction.

16 Claims, 14 Drawing Sheets

HEAT SHIELD FOR FUEL NOZZLE

TECHNICAL FIELD

The present disclosure relates to a heat shield for a fuel nozzle in a combustor of a gas turbine engine.

BACKGROUND

Some combustors in use are known as TAPS (Twin Annular Premixing Swirler) combustors. TAPS combustors include a pre-mixer/swirler fuel nozzle assembly in which air and fuel are mixed. The pre-mixer/swirler fuel nozzle assembly includes both a pilot swirler and a main pre-mixer. The pilot swirler ejects a fuel/air mixture into a venturi. The fuel/air mixture exits the venturi into a combustion chamber, where it is ignited and burned. At the outlet end of the venturi, a heat shield is generally provided to protect the fuel nozzle assembly.

BRIEF SUMMARY

According to one aspect, the present disclosure relates to a heat shield for a fuel nozzle of a gas turbine engine combustor, where the heat shield defines a radial direction, a longitudinal direction along a centerline axis, and a circumferential direction about the centerline axis. The heat shield includes a radial flange extending in the radial direction and the circumferential direction, the radial flange having an opening therethrough at a radially inward end of the radial flange, and an annular conical wall extending in the longitudinal direction and the circumferential direction, the annular conical wall being connected to the radial flange at the radially inward end of the radial flange. The radial flange includes a flange forward side, and a flange aft side, and the radial flange further has a flange outer end portion. The flange outer end portion includes a flange rounded end portion on one of the flange forward side or the flange aft side, and a flange rounded protruding lip on the other of the flange forward side or the flange aft side, the flange rounded protruding lip extending in the longitudinal direction.

According to another aspect, the present disclosure relates to a fuel nozzle assembly for a gas turbine engine, the fuel nozzle assembly defining a radial direction, a longitudinal direction along a fuel nozzle centerline axis, and a circumferential direction about the fuel nozzle centerline axis. The fuel nozzle assembly includes: a fuel nozzle housing; a fuel nozzle disposed within the fuel nozzle housing; and a heat shield. The heat shield includes: a radial flange extending in the radial direction and the circumferential direction, the radial flange having an opening therethrough at a radially inward end of the radial flange; and an annular conical wall extending in the longitudinal direction and the circumferential direction, the annular conical wall being connected to the radial flange at the radially inward end of the radial flange. The radial flange has a flange forward side, and a flange aft side, and the radial flange further has a flange outer end portion. The flange outer end portion includes a flange rounded end portion on one of the flange forward side or the flange aft side, and a flange rounded protruding lip on the other of the flange forward side or the flange aft side, the flange rounded protruding lip extending in the longitudinal direction.

Additional features, advantages, and embodiments of the present disclosure are set forth or apparent from consideration of the following detailed description, drawings and claims. Moreover, it is to be understood that both the foregoing summary and the following detailed description are exemplary and intended to provide further explanation without limiting the scope of the disclosure as claimed.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Various embodiments are discussed in detail below. While specific embodiments are discussed, this is done for illustration purposes only. A person skilled in the relevant art will recognize that other components and configurations may be used without departing from the spirit and scope of the present disclosure.

As used herein, the terms “first”, “second”, and “third” may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

TAPS combustors are known to include a fuel nozzle assembly that has a pilot swirler that includes a venturi. The pilot swirler ejects a fuel/air mixture into the venturi and then into a combustion chamber, where it is ignited and burned. At the outlet end of the venturi, a heat shield is generally provided to protect the fuel nozzle assembly. The conventional heat shield includes a flange that is generally aligned perpendicular to the fuel nozzle centerline and the outer edge of the heat shield flange is a squared-off tip. As the fuel/air mixture exiting the venturi is burned, the path of the flow out of the venturi results in a hot zone at the heat shield flange aft surface.

The present disclosure addresses the foregoing by providing a heat shield with a shaped flange that reduces flow separation at the flange outer edge. According to the present disclosure, the heat shield flange may be angled aft, or include an angled portion, instead of being perpendicular to the fuel nozzle centerline axis. The heat shield flange may also include a shaped outer end, where an aft portion of the flange outer end may be aerodynamically rounded, and a forward portion of the flange outer end may include a forward protruding lip portion. The forward protruding lip portion and the rounded aft portion form a more aerodynamic outer edge of the heat shield flange that reduces the flow separation, and thereby, reduces the temperature at the outer edge and the aft surface of the flange. The shaped flange outer end may further include cooling holes therethrough, so as to provide even further surface cooling along the flange outer end aft surface, and to provide better cooling of the flange outer end itself. Thus, the present disclosure provides for better reliability than a conventional heat shield by reducing the prospect of a warped flange.

Figure 1:
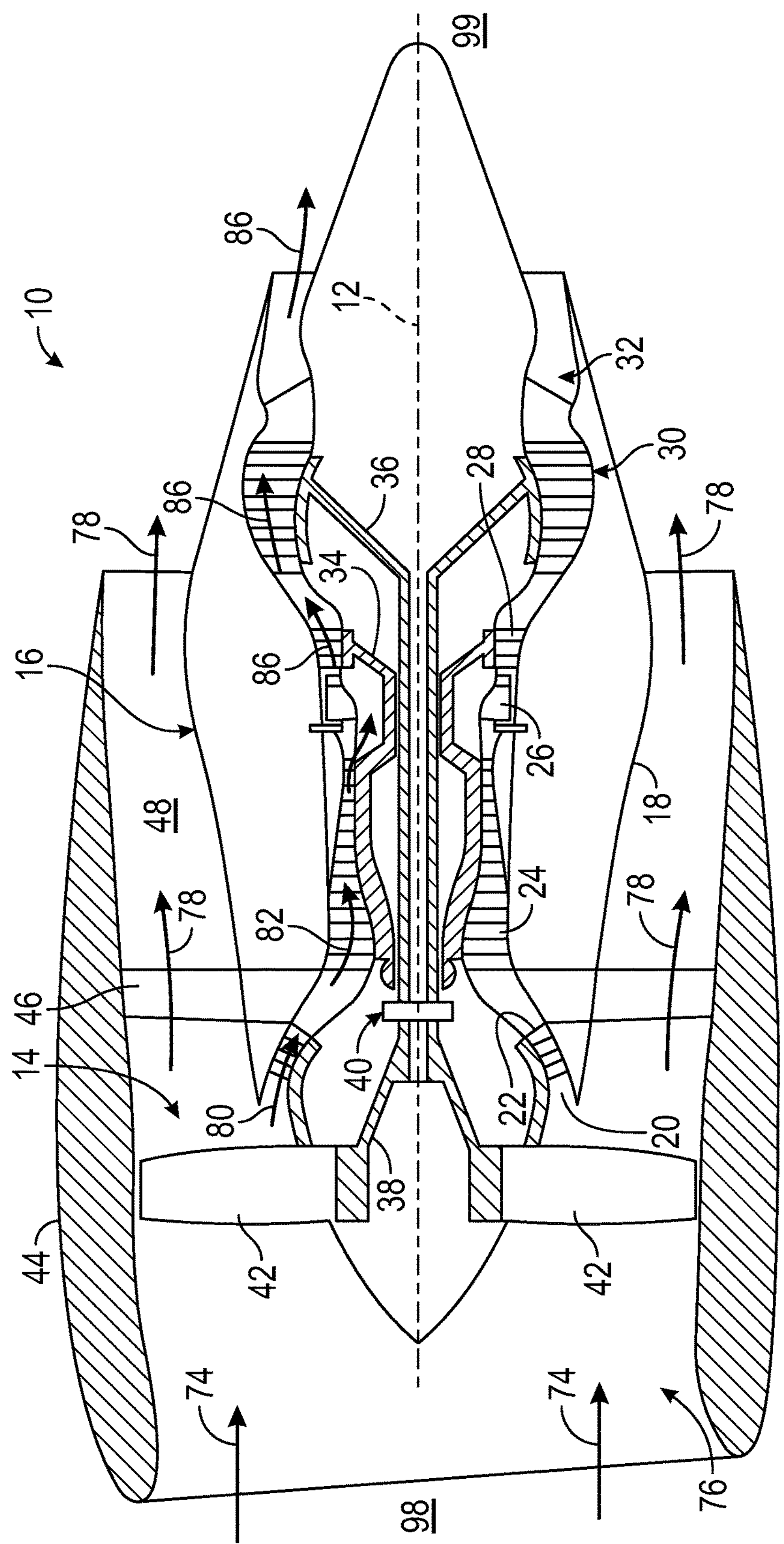
FIG. 1 is a schematic partial cross-sectional side view of an exemplary high bypass turbofan jet engine, according to an aspect of the present disclosure.

Referring now to the drawings, FIG. 1 is a schematic partial cross-sectional side view of an exemplary high by-pass turbofan jet engine 10, herein referred to as "engine 10," as may incorporate various embodiments of the present disclosure. Although further described below with reference to a turbofan engine, the present disclosure is also applicable to turbomachinery in general, including turbojet, turboprop, and turboshaft gas turbine engines, including marine and industrial turbine engines and auxiliary power units. As shown in FIG. 1, engine 10 has a longitudinal or axial centerline axis 12 that extends therethrough from an upstream end 98 to a downstream end 99 for reference purposes. In general, engine 10 may include a fan assembly 14 and a core engine 16 disposed downstream from the fan assembly 14.

The core engine 16 may generally include an outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30, and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40, such as in an indirect-drive or a geared-drive configuration. In other embodiments, although not illustrated, the engine 10 may further include an intermediate pressure (IP) compressor and a turbine rotatable with an intermediate pressure shaft.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. In one embodiment, the nacelle 44 may be supported relative to the core engine 16 by a plurality of circumferentially spaced outlet guide vanes or struts 46. Moreover, at least a portion of the nacelle 44 may extend over an outer portion of the core engine 16 so as to define a bypass airflow passage 48 therebetween.

Figure 2:
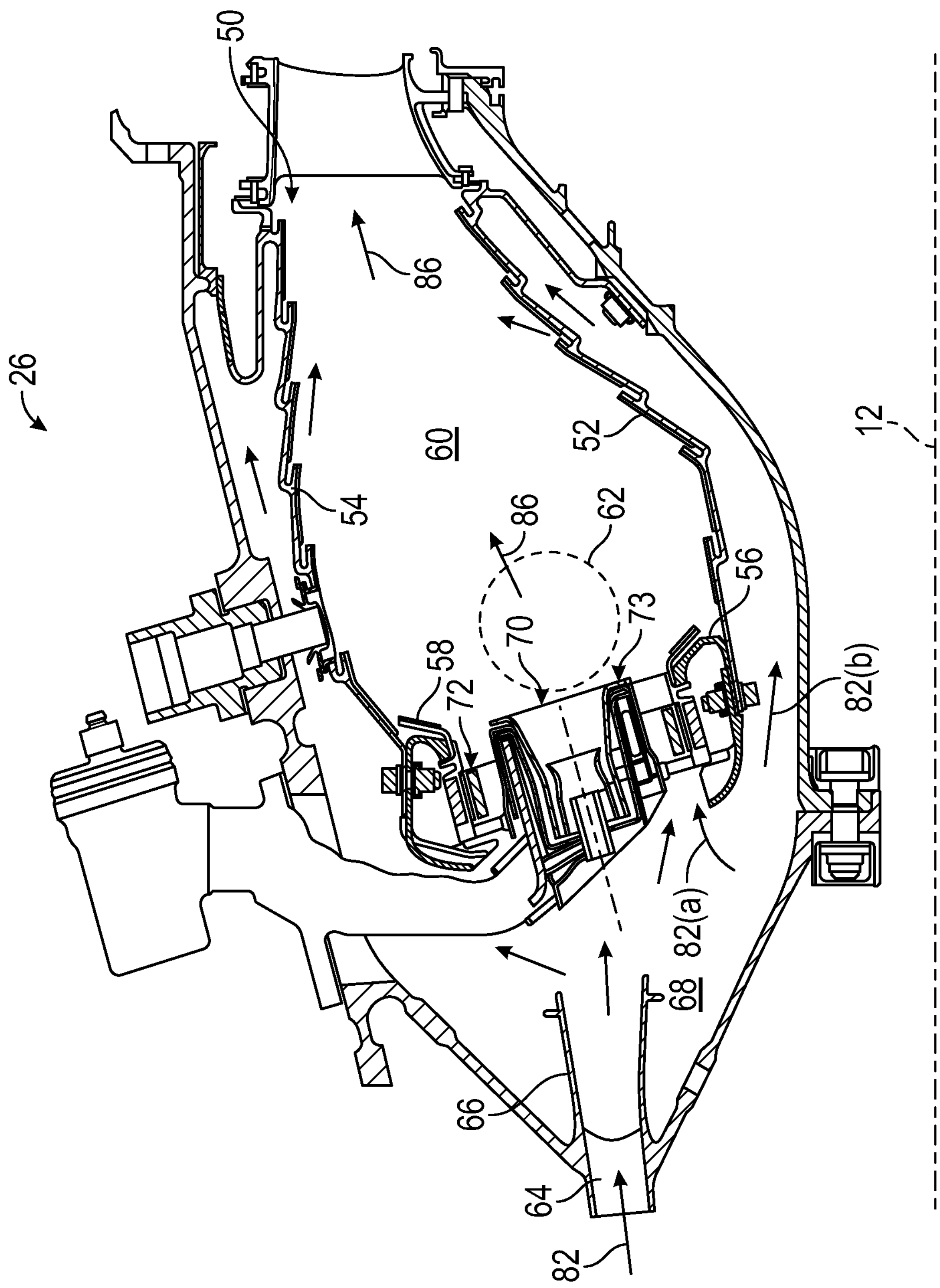
FIG. 2 is a partial cross-sectional side view of an exemplary combustion section, according to an aspect of the present disclosure.

FIG. 2 is a partial cross-sectional side view of an exemplary combustion section 26 of the core engine 16 as shown in FIG. 1. The combustion section 26 in FIG. 2 is depicted as an exemplary Twin Annular Premixing Swirler (TAPS) type combustor section. However, the heat shield of the present disclosure can be implemented in other combustor types where fuel nozzle heat shields are employed, and the TAPS combustion section is merely exemplary. As shown in FIG. 2, the combustion section 26 may generally include an annular type combustor assembly 50 having an annular inner liner 52, an annular outer liner 54, a bulkhead wall 56, and a dome assembly 58, together defining a combustion chamber 60. The combustion chamber 60 may more specifically define a region defining a primary combustion zone 62 at which initial chemical reaction of a fuel-oxidizer mixture and/or recirculation of combustion gases 86 may occur before flowing further downstream, where mixture and/or recirculation of combustion products and air may occur before flowing to the HP and LP turbines 28, 30.

During operation of the engine 10, as shown in FIGS. 1 and 2 collectively, a volume of air as indicated schematically by arrows 74 enters the engine 10 from upstream end 98 through an associated inlet 76 of the nacelle 44 and/or fan assembly 14. As the air 74 passes across the fan blades 42, a portion of the air as indicated schematically by arrows 78 is directed or routed into the bypass airflow passage 48, while another portion of the air as indicated schematically by arrow 80 is directed or routed into the LP compressor 22. Air 80 is progressively compressed as it flows through the LP and HP compressors 22, 24 towards the combustion section 26. As shown in FIG. 2, the now compressed air, as indicated schematically by arrow 82, flows across a compressor exit guide vane (CEGV) 64 and through a pre-diffuser 66 into a diffuser cavity 68 of the combustion section 26.

The compressed air 82 pressurizes the diffuser cavity 68. A first portion of the compressed air 82, as indicated schematically by arrows 82(*a*), flows from the diffuser cavity 68 into a pre-mixer/fuel-nozzle assembly 70 where it is premixed with fuel and ejected from pre-mixer/fuel-nozzle assembly 70 and burned, thus generating combustion gases, as indicated schematically by arrows 86, within the primary combustion zone 62 of the combustor assembly 50. Typically, the LP and HP compressors 22, 24 provide more compressed air to the diffuser cavity 84 than is needed for combustion. Therefore, a second portion of the compressed air 82, as indicated schematically by arrows 82(*b*), may be used for various purposes other than combustion.

Referring back to FIGS. 1 and 2 collectively, the combustion gases 86 generated in the combustion chamber 60 flow from the combustor assembly 50 into the HP turbine 28, thus causing the HP rotor shaft 34 to rotate, thereby supporting operation of the HP compressor 24. As shown in FIG. 1, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the core engine 16 to provide propulsion at downstream end 99.

Figure 3:
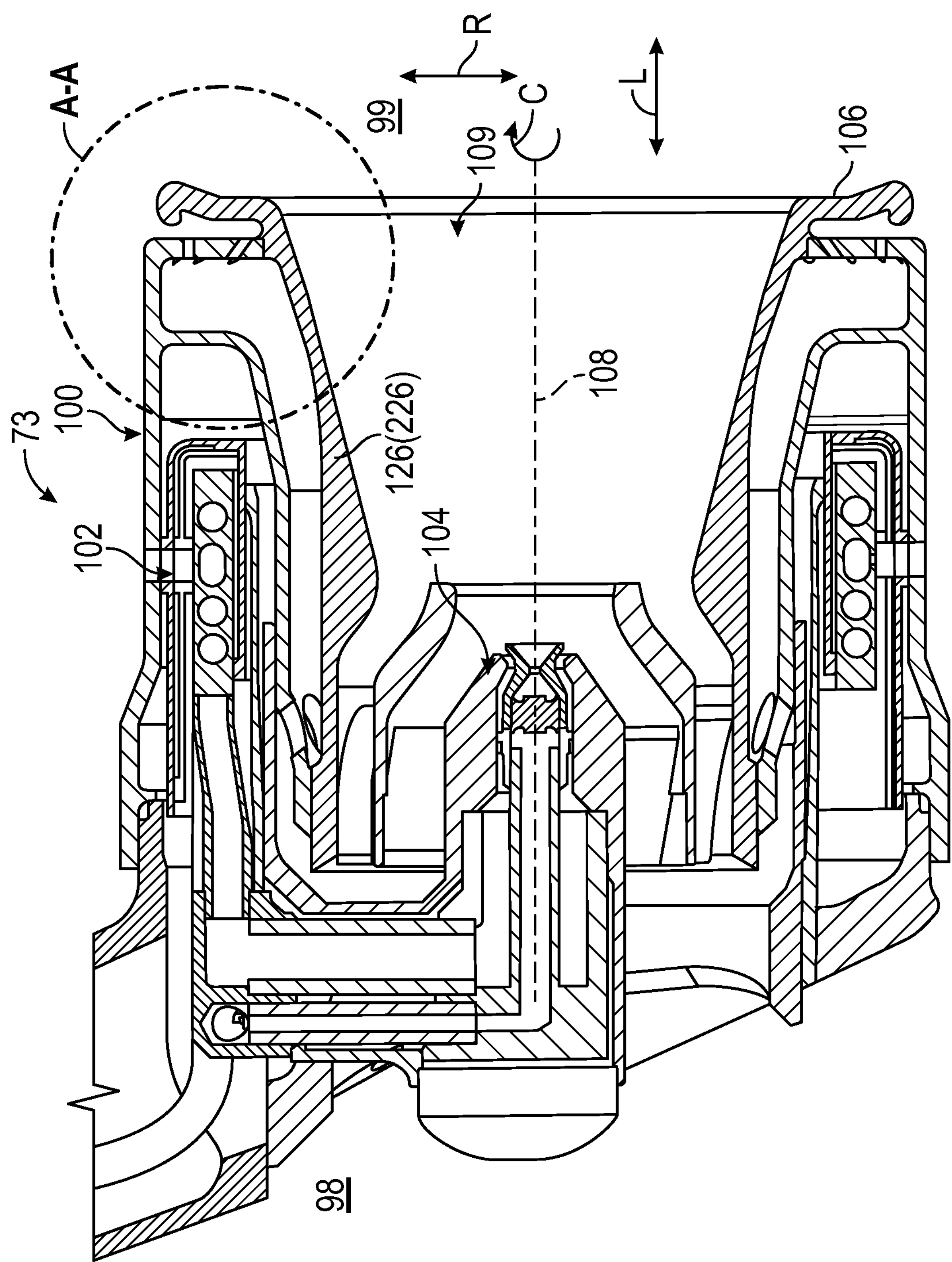
FIG. 3 is a partial cross-sectional side view of an exemplary fuel nozzle assembly, according to an aspect of the present disclosure.

FIG. 3 is a partial cross-sectional side view of an exemplary fuel nozzle assembly 73, according to an aspect of the present disclosure. It is noted that, in FIG. 2, the pre-mixer/fuel nozzle assembly 70 includes both the fuel nozzle assembly 73 of FIG. 3, and a main pre-mixer 72 attached thereto. The main pre-mixer 72 is not depicted in FIG. 3 and only the fuel nozzle assembly 73 is depicted therein. The fuel nozzle assembly 73 is seen to include a housing 100, which contains, among other elements, a main fuel injection portion 102 and a pilot fuel nozzle 104. The pilot fuel nozzle 104 and the housing 100 are generally defined circumferentially about fuel nozzle centerline axis 108 extending in a longitudinal direction (L). A direction generally orthogonal to the fuel nozzle centerline axis 108 is seen to be a radial direction (R) and a circumferential direction (C) is taken about the fuel nozzle centerline axis 108. An upstream end 98 of the fuel nozzle assembly 73 is also referred to as a forward end, while a downstream end 99 of the fuel nozzle assembly is also referred to as an aft end. As seen in FIG. 3, a heat shield 106 is included at the aft end of the fuel nozzle assembly 73. The heat shield 106, like the housing 100, is generally formed radially outward from, and circumferentially about the fuel nozzle centerline axis 108. An opening 109 in the heat shield defines a fuel nozzle opening of the heat shield, where a pre-mixed fuel/air mixture from the pilot fuel nozzle 104, and surrounding pilot air ducts, is injected to be ignited and burned. An aft forward-looking view of the heat shield is depicted in, for example, FIG. 9, which will be described in more detail below.

Figure 4:
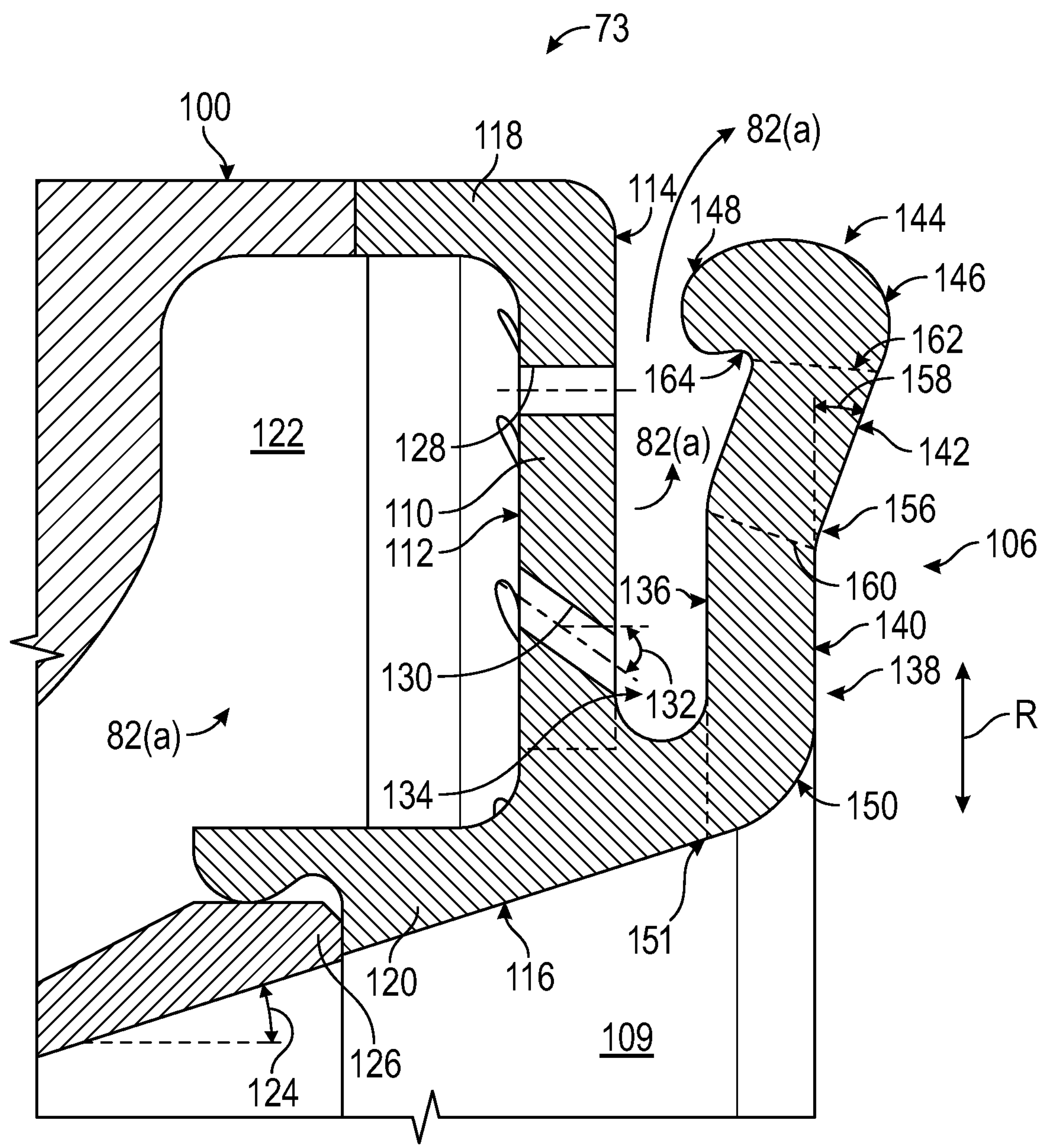
FIG. 4 is a partial cross-sectional side detail view of a portion of a heat shield, taken at detail A-A in FIG. 3, according to an aspect of the present disclosure.

FIGS. 4 to 8 are partial cross-sectional side views of a first aspect of the present disclosure depicting a portion of the heat shield and housing 100 taken at detail A-A of FIG. 3. FIGS. 10 to 14 are similar partial cross-sectional side views, but of another aspect of the heat shield in the present disclosure. FIGS. 10 to 14 will be discussed below. Referring to FIG. 4, the heat shield 106 of the first aspect is seen to include an annular forward wall 110 that extends in the radial direction (R) and also extends in the circumferential direction (C) about the fuel nozzle centerline axis 108. It is noted that the fuel nozzle centerline axis 108 may also be referred to below as a heat shield centerline axis 108(*a*), since a portion of the fuel nozzle centerline axis 108 extends through the heat shield and is therefore, one and the same. The annular forward wall 110 has a forward surface 112 and an annular forward wall aft surface 114. The annular forward wall 110 is seen to include an outer forward wall extension 118. The outer forward wall extension 118 generally extends forward in the longitudinal direction, as well as circumferentially about the heat shield centerline axis 108(*a*). The outer forward wall extension 118 can be joined to the housing 100 to thereby form an air chamber 122 therewithin. Some of the air 82(*a*) that enters the pre-mixer/fuel nozzle assembly 70 is provided to the air chamber 122 to be used as a coolant to cool the heat shield, as will be described below.

The heat shield 106 further includes an annular conical wall 120 that extends in the longitudinal direction and the circumferential direction. The annular conical wall 120, at a forward end thereof, can be joined to, and generally forms at least a part of a fuel nozzle venturi 126. The annular conical wall has an inner surface 116 that defines a portion of the opening 109. The inner surface 116 is seen to have a conical half angle 124 such that, the inner surface 116 forms a conical opening that is commensurate with the conical half angle of the fuel nozzle venturi 126 of the fuel nozzle assembly 73.

The annular forward wall 110 is further seen to include cooling holes 128, 130 extending through the wall from forward surface 112 to annular forward wall aft surface 114. The cooling holes may be aligned longitudinally (i.e., with the fuel nozzle centerline axis 108) as seen with cooling hole 128, or the cooling holes may be aligned at an angle 132 with respect to the heat shield centerline axis 108(*a*), as seen with cooling hole 130. While the cooling hole 130 is shown with the angle 132 extending outward to inward from the forward surface 112 to the annular forward wall aft surface 114, the cooling holes 130 may be angled in the opposing direction instead. In addition, while two cooling holes are shown in the cross section of FIG. 4, more than two cooling holes could be located at the cross section. The cooling holes included in the annular forward wall are arranged about the circumference of the annular forward wall 110 (see FIG. 9). The number and arrangement of the cooling holes through the annular forward wall 110 is not limited to any particular number or arrangement, and the number and arrangement can be selected based on a desired cooling effect to be provided to the heat shield 106.

As was briefly discussed above, a portion of the air 82(*a*) is provided to the air chamber 122 in the fuel nozzle assembly 73. The air 82(*a*) flows from the air chamber 122 through the cooling holes 128, 130 into a gap 134 provided between the annular forward wall aft surface 114 and a flange forward side 136 of a radial flange 138 (to be described below). The air 82(*a*) flowing through the cooling holes 128, 130 provides cooling to the flange forward side 136 of the radial flange 138. As will be described below in more detail, the air 82(*a*) flows outward through the gap to provide further cooling of the radial flange 138.

The heat shield 106 is further seen to include a radial flange 138 that extends in the radial direction and the circumferential direction about the fuel nozzle centerline axis 108. A first portion of the radial flange 138, closest to the heat shield centerline axis, is an inner portion 140 that extends outward in the radial direction R. The flange inner portion 140 has a surface 150 that forms a part of the opening 109 and the inner portion 140 extends radially outward from the surface 150. An aft corner of the surface 150 is seen to be rounded so as to provide an aerodynamic flow surface for the fuel/air mixture exiting the heat shield portion of the fuel nozzle assembly 73.

The radial flange 138 is connected to the annular conical wall 120 at a radially inward end 151 of the inner portion 140. The radial flange 138 and the annular forward wall 110 are connected to the annular conical wall 120 so as to form a gap 134 between the annular forward wall 110 and the radial flange 138. The gap 134 extends radially outward so that a gap opening 168 (see FIG. 5) is formed as a flow passage to allow air 82(*c*) to pass from the gap 134 radially outward toward a flange outer end portion 144 of the radial flange 138. The radial flange 138 is also seen to include a flange forward side 136 and a flange aft side 156. The flange forward side 136 faces the gap 134 and is cooled by the air 82(*a*) from the cooling holes 128, 130. The flange aft side 156 faces the combustion chamber 60.

As seen in FIG. 4, the inner portion 140 may be generally parallel to the annular forward wall 110. Alternatively, the inner portion 140 may be angled radially outward and aft with respect to the heat shield centerline axis. (See, e.g., FIG. 8, to be described below). In FIG. 4, the radial flange 138 of one aspect may also include a flange angled portion 142 outward of the inner portion 140. The flange angled portion 142 may generally extend radially outward from an outer end 160 of the inner portion 140, and may also extend in the longitudinal direction, either forward or aft. In some embodiments, an angle 158 of the angled portion 142, with respect to the radial direction R, may have a range of minus 30 degrees (for a forward angled portion) to 45 degrees (for an aft angled portion).

The radial flange 138 is also seen to include a flange outer end portion 144 disposed outward of an outer end 162 of the flange angled portion 142. The flange outer end portion 144 in FIG. 4 is seen to include a rounded end portion 146 and a rounded protruding lip 148. The rounded protruding lip 148 extends in the longitudinal direction from the flange outer end portion 144. In the aspect shown in FIG. 4, the rounded portion 146 is shown on the aft side of the flange outer end portion 144, while the rounded protruding lip 148 is shown on the forward side of the flange outer end portion 144, extending longitudinally in the forward direction. Of course, the present disclosure is not limited to the rounded portion 146 being on the flange aft side and the rounded protruding lip 148 being on the flange forward side, and these two elements could be reversed instead. (See, e.g., FIG. 8).

The rounded protruding lip 148 can be seen to form a crease 164 where the rounded protruding lip 148 intersects the forward side surface of the flange angled portion 142. Of course, where the rounded protruding lip 148 is disposed on the aft surface side of the radial flange 138, the crease 164 would be between the rounded protruding lip 148 and the aft surface of the flange. The crease 164 helps to trap some of the air 82(*a*) within the gap 134 so as to provide better cooling of the radially outer end of the radial flange 138.

Figure 5:
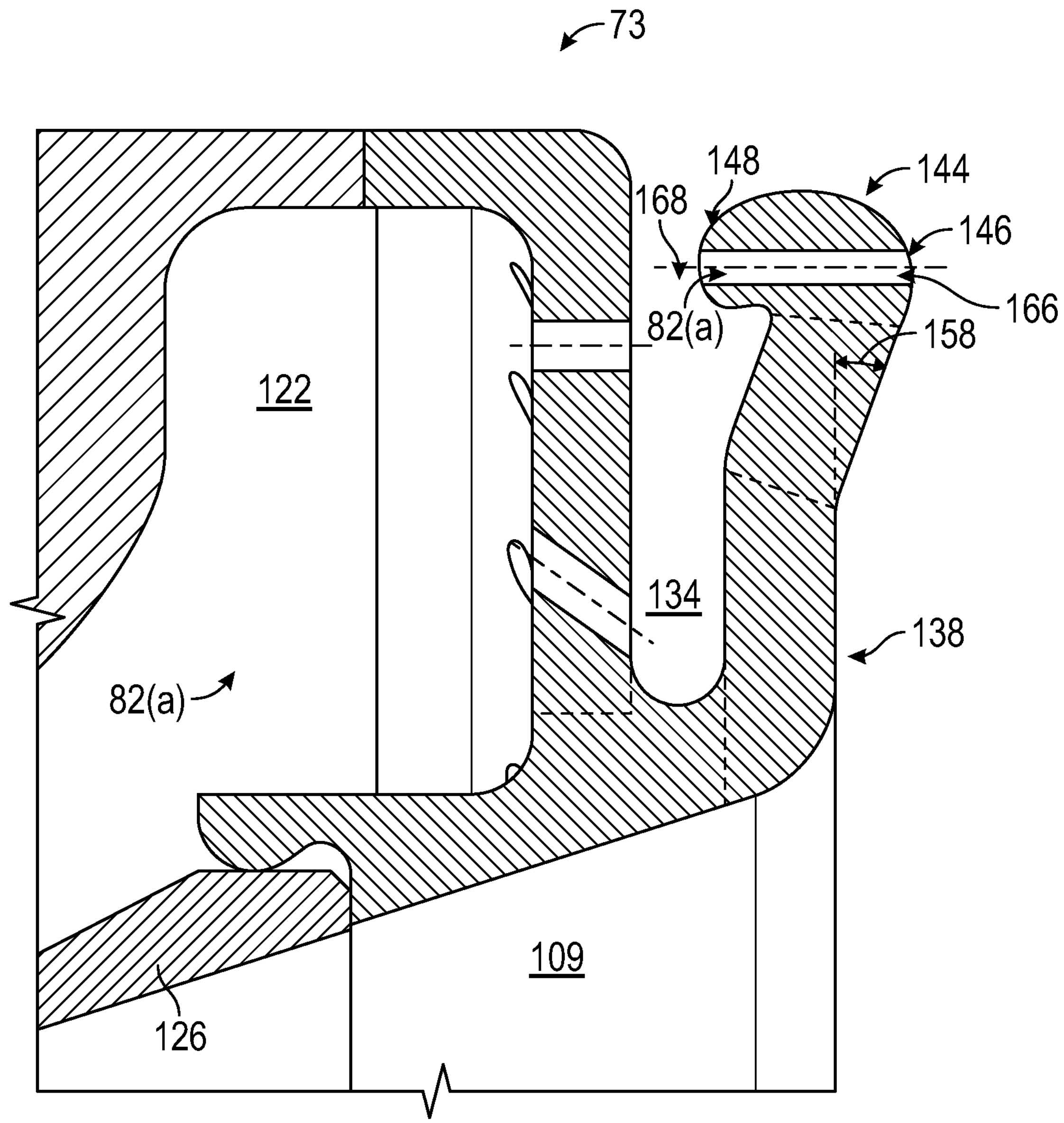
FIG. 5 is a partial cross-sectional side detail view of a portion of a heat shield, taken at detail A-A in FIG. 3, according to another aspect of the present disclosure.
Figure 9:
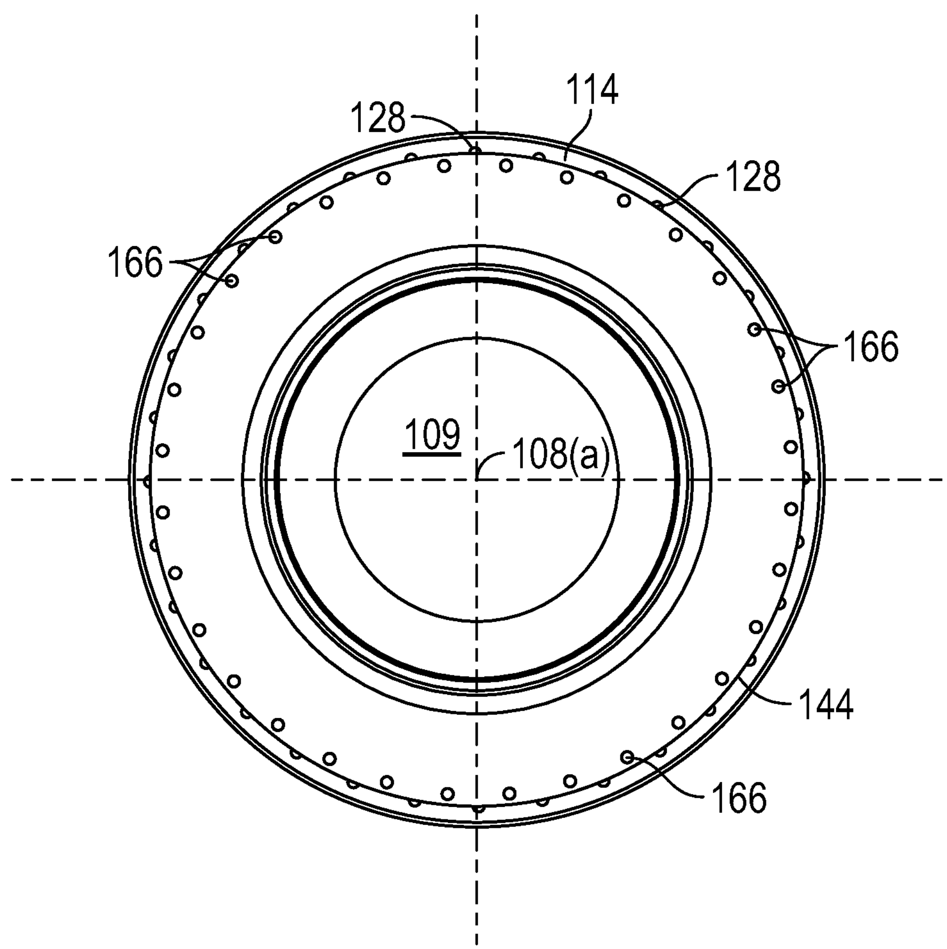
FIG. 9 is an aft forward-looking view of an exemplary heat shield according to an aspect of the present disclosure.

FIG. 5 depicts another aspect of the heat shield according to the present disclosure, similar to that shown in FIG. 4. In FIG. 5, the flange outer end portion 144 is seen to include flange tip cooling holes 166. As seen in FIG. 9, the flange tip cooling holes 166 are spaced circumferentially around the circumference of the flange outer end portion 144. In some aspects, the heat shield may include between twenty and forty flange tip cooling holes 166 spaced about the circumference. Of course, the number of flange tip cooling holes is not limited to the foregoing range and any number of cooling holes may be implemented depending on the specific cooling effect to be achieved.

A portion of the air 82(*a*) that flows outward from the gap 134 through the gap opening 168 flows through the flange tip cooling holes 166. The air 82(*a*) that flows through the flange tip cooling holes 166 provides for cooling of the flange outer end portion 144, and also provides for cooling of the aft surface of the flange outer end portion 144. The cooling of the flange outer end portion (or flange tip) helps to reduce warping that is caused by overheating in the conventional heat shield. The flange tip cooling holes 166 may have an equal diameter through the entire length of the hole, or, while not depicted in the figures, may by convergent or divergent. That is, the cooling holes may have a larger diameter on the forward side of the flange than on the aft side of the flange (i.e., the holes are convergent), or they may have a smaller diameter at the forward side of the flange than at the aft end of the flange (i.e., the holes are divergent).

Figure 6:
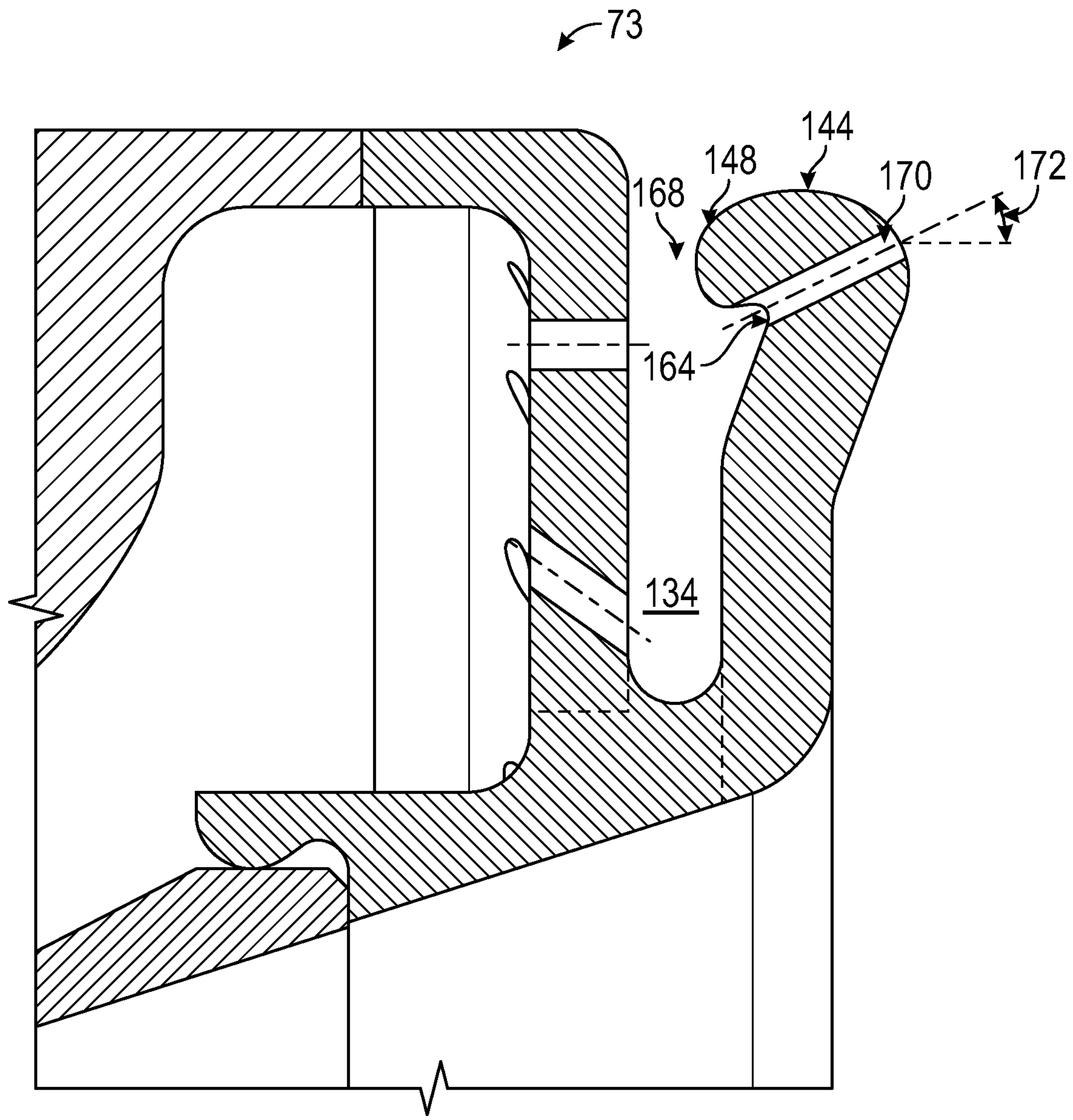
FIG. 6 is a partial cross-sectional side detail view of a portion of a heat shield, taken at detail A-A in FIG. 3, according to yet another aspect of the present disclosure.

FIG. 6 depicts another aspect of the heat shield according to the present disclosure, similar to that shown in FIG. 5. In FIG. 6, flange tip cooling holes 170 are shown to be angled, as compared to the flange tip cooling holes 166 of FIG. 5 that extend longitudinally. The flange tip cooling holes 170 are seen to extend from the crease 164 through the rounded portion 146 at a cooling hole angle 172 with respect to the heat shield centerline axis 108(*a*). In some aspects, the cooling hole angle 172 may range from zero degrees to ninety degrees. Of course, the present disclosure is not limited to the foregoing range and other angles may be implemented instead, depending on the heat shield tip cooling effect to be achieved. Similar to the flange tip cooling holes 166 of FIG. 5, the air 82(*a*) that flows through the flange tip cooling holes 170 provides for cooling of the flange outer end portion 144, and provides for cooling of the rounded portion 146 of the aft surface of the flange outer end portion 144.

Figure 7:
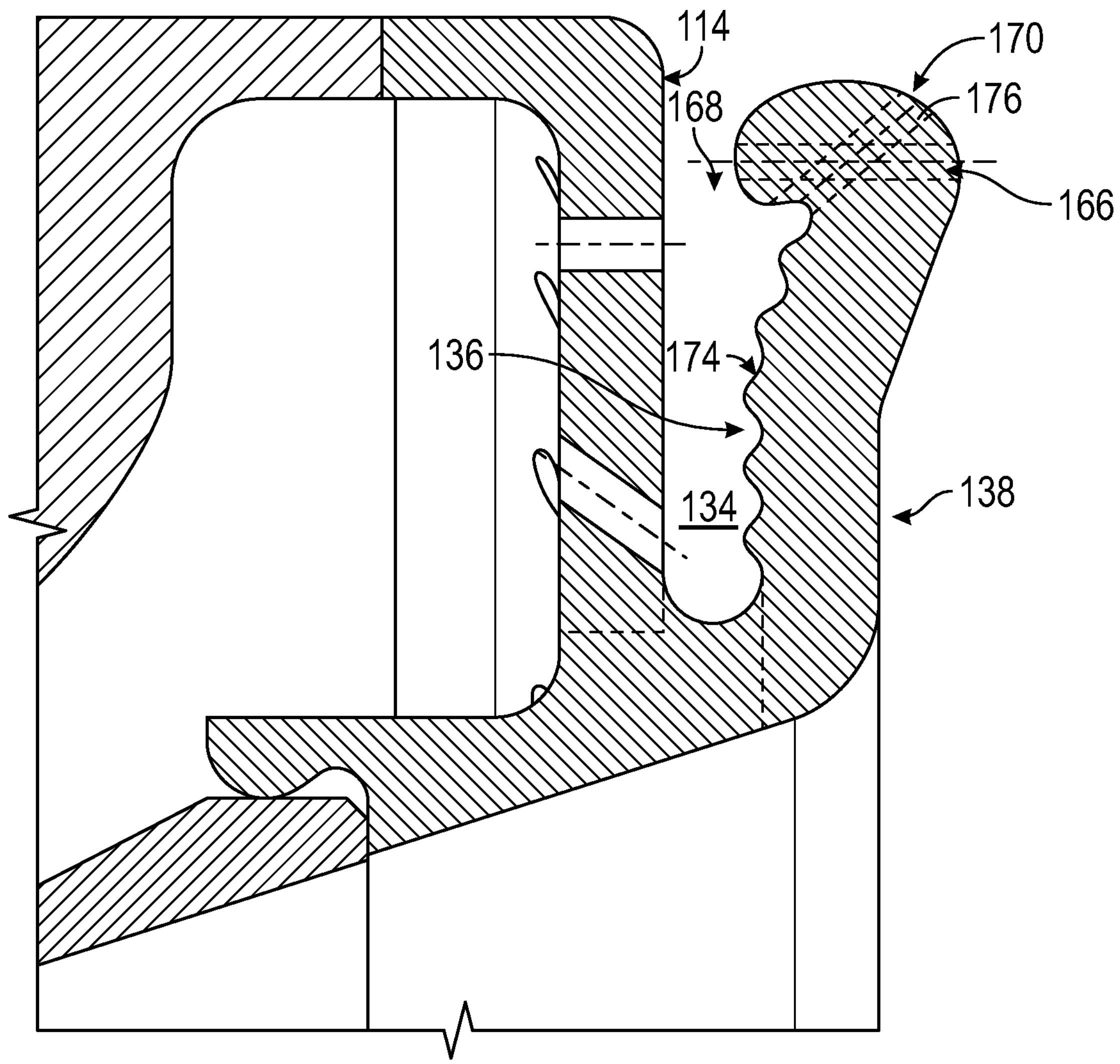
FIG. 7 is a partial cross-sectional side detail view of a portion of a heat shield, taken at detail A-A in FIG. 3, according to still another aspect of the present disclosure.

FIG. 7 depicts another aspect of a heat shield according to the present disclosure. In FIG. 7, the radial flange 138 is seen to be similar to the radial flange 138 shown in FIG. 4. In FIG. 7, however, the surface of the flange forward side 136 is seen to include a corrugated surface 174. The corrugated surface 174 can provide additional cooling to the flange over the entire length of the flange by providing additional surface area to interact with the air 82(*a*) in the gap 134. As seen in FIG. 7, flange tip cooling holes 166 or 170 may optionally be included in conjunction with the corrugated surface 174.

Figure 8:
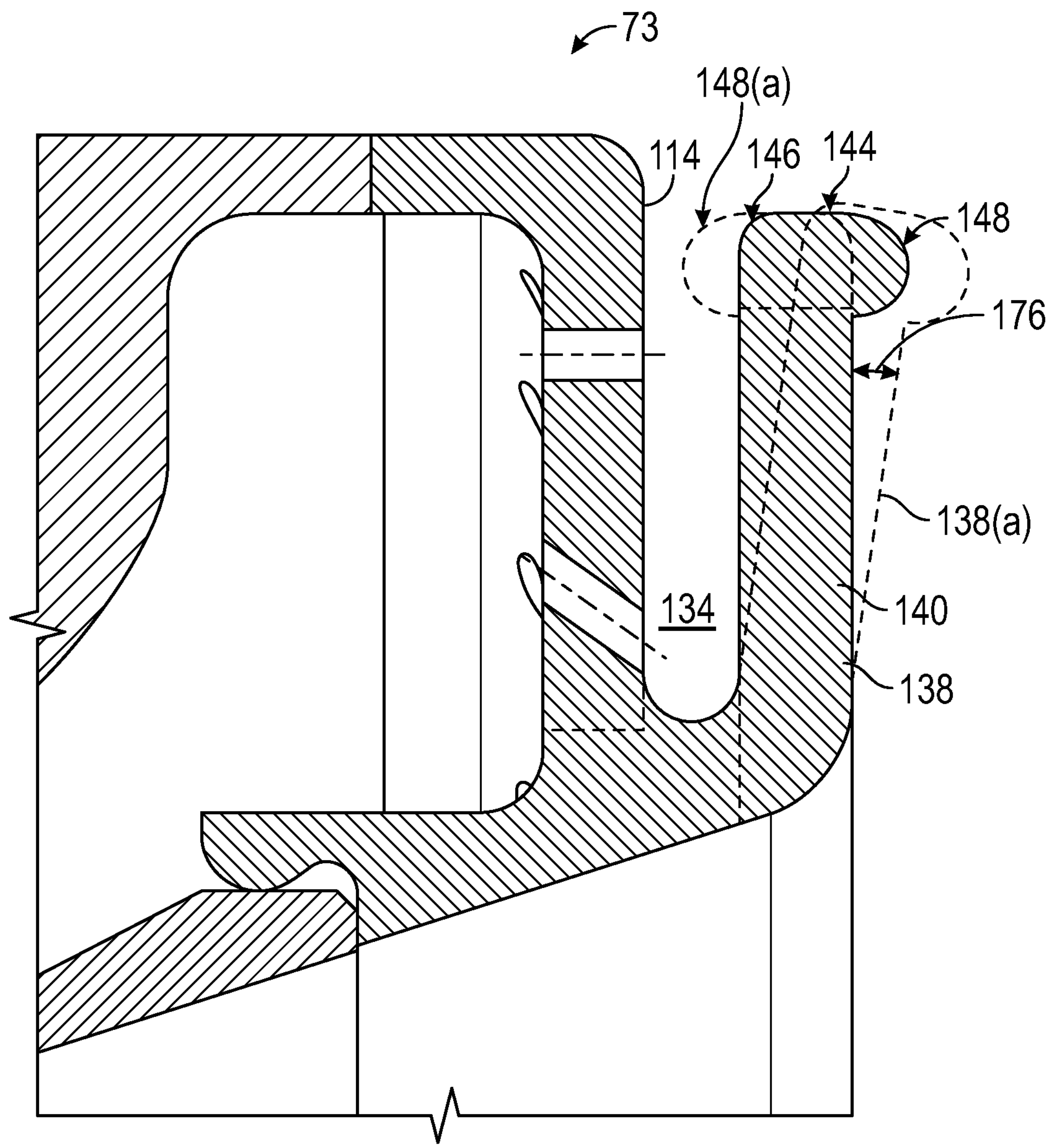
FIG. 8 is a partial cross-sectional side detail view of a portion of a heat shield, taken at detail A-A in FIG. 3, according to yet another aspect of the present disclosure.

FIG. 8 depicts still another aspect of the heat shield according to the present disclosure. In the arrangements of FIGS. 4 to 7, the radial flange 138 was depicted with an inner portion 140, an angled portion 142, and a flange outer end portion 144. In the FIG. 8 aspect, the radial flange 138 is seen to include the inner portion 140 that extends to the flange outer end portion 144, and excludes the angled portion 142. As an alternative to the angle that may be provided by the omitted angled portion, the inner portion 140 may be angled at an angle 176, such that a radial flange 138(*a*) is included. The angle 176 may range from minus twenty degrees to forty-five degrees. That is, while FIG. 8 depicts the radial flange 138(*a*) angled in the aft direction, the radial flange 138(*a*) may be angled in the forward direction instead (thus, the minus degree angle). Of course, the angle range is not limited to the foregoing and other angles could be implemented, depending on the desired cooling effect to be achieved.

In addition, in the FIG. 8 aspect, as compared to the arrangements of FIGS. 4 to 7, the rounded protruding lip 148 and the rounded portion 146 are shown reversed, with the rounded protruding lip 148 extending from the aft surface side of the radial flange 138 instead of the forward surface side of the radial flange 138. Of course, the protruding lip portion could be included in the same manner as shown in FIGS. 4 to 7 (see, e.g., 148(*a*)). Further, while not depicted in FIG. 8, the flange tip cooling holes 166 (FIG. 5) or 170 (FIG. 6) could also be implemented with the aspect of FIG. 8. Similarly, the corrugated surface 174 (see FIG. 7) could also be implemented with the aspect of FIG. 8.

Referring now to FIGS. 10 to 14, a heat shield according to another aspect of the present disclosure will be described. In the aspects shown in FIGS. 4 to 8, the heat shield was shown to be formed integrally to include the radial flange 138, the annular conical wall 120, and the annular forward wall 110 as a single unit. That single unit heat shield can then be connected to the fuel nozzle housing 100 at the outer forward wall extension 118, connected via the annular conical wall 120 to the fuel nozzle venturi 126. In the present aspects of FIGS. 10 to 14, however, the heat shield will be described as constituting the radial flange 138 connected to the annular conical wall 226, which itself forms the fuel nozzle venturi. This aspect can then be connected to the housing at an aft radial wall of the fuel nozzle housing, where the aft radial wall of the fuel nozzle housing is similar to the annular forward wall 110. In FIGS. 10 to 14, elements with the same reference numbers as used in the aspects of FIGS. 4 to 8 are deemed to be similar to, or the same as those previously described.

Figure 10:
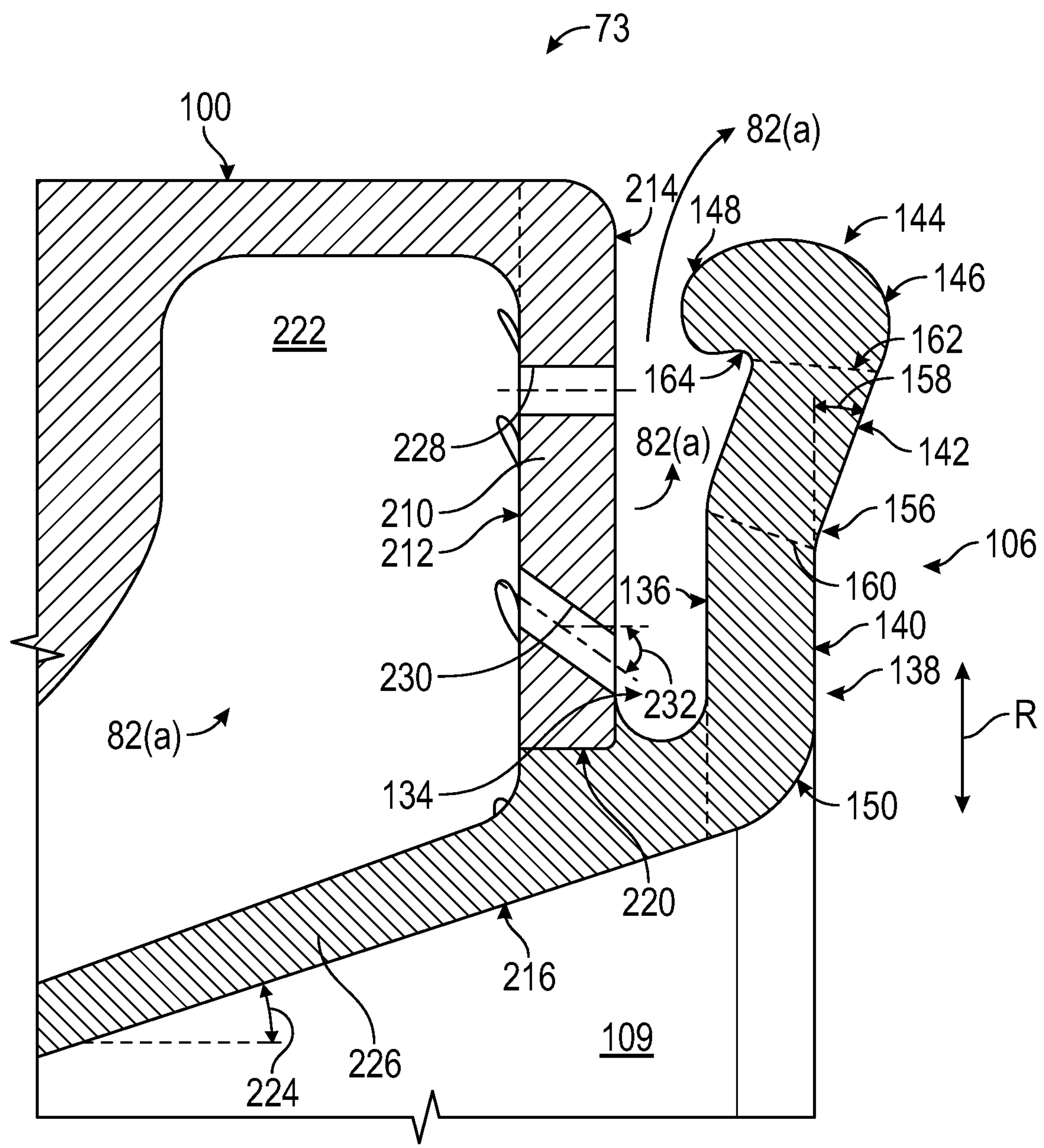
FIG. 10 is a partial cross-sectional side detail view of a portion of a heat shield, taken at detail A-A in FIG. 3, according to another aspect of the present disclosure.

In FIG. 10, the heat shield of the present aspect is seen to include a radial flange 138, which is the same as the radial flange 138 described above with regard to FIGS. 4 to 8. The radial flange 138 of the present aspect is connected at a radially inner end of inner portion 140 to an annular conical wall 226. Here, in contrast to the above aspect of FIGS. 4 to 8, the annular conical wall 226 forms the fuel nozzle venturi rather than forming a portion of the fuel nozzle venturi toward the aft end of the fuel nozzle. The annular conical wall 226 has an inner surface 216 that forms the surface of the venturi. The annular conical wall 226 is also seen to include a conical half angle 224 with respect to the fuel nozzle centerline axis 108, which is an angle set for the annular conical wall 226 (i.e., the venturi). The conical half angle 224 may be the same as the conical half angle 124 of FIG. 4.

Similar to the above aspects of FIGS. 4 to 8, the fuel nozzle assembly 73 includes the housing 100. At an aft end of the housing 100, a housing aft radial wall 210 is included. The housing aft radial wall 210 is similar to the annular forward wall 110 of FIGS. 4 to 8. Thus, the housing aft radial wall 210 can be seen to include an aft wall forward surface 212 and an aft wall aft surface 214, with cooling holes 228 and 230 extending through the housing aft radial wall 210. The cooling holes 228 and 230 may be similar to the cooling holes 128 and 130 of the above aspect in FIGS. 4 to 8, including the cooling hole 230 being arranged at an angle 232 (similar to angle 132).

A radial inner end 220 of the housing aft radial wall 210 is joined to the annular conical wall 226, such that the gap 134 is formed between the housing aft radial wall 210 and the radial flange 138. As a result, an air chamber 222 (similar to the air chamber 122) is formed for air 82(*c*) to flow into the air chamber 222, and then through the cooling holes 228 and 230 into the gap 134.

Figure 11:
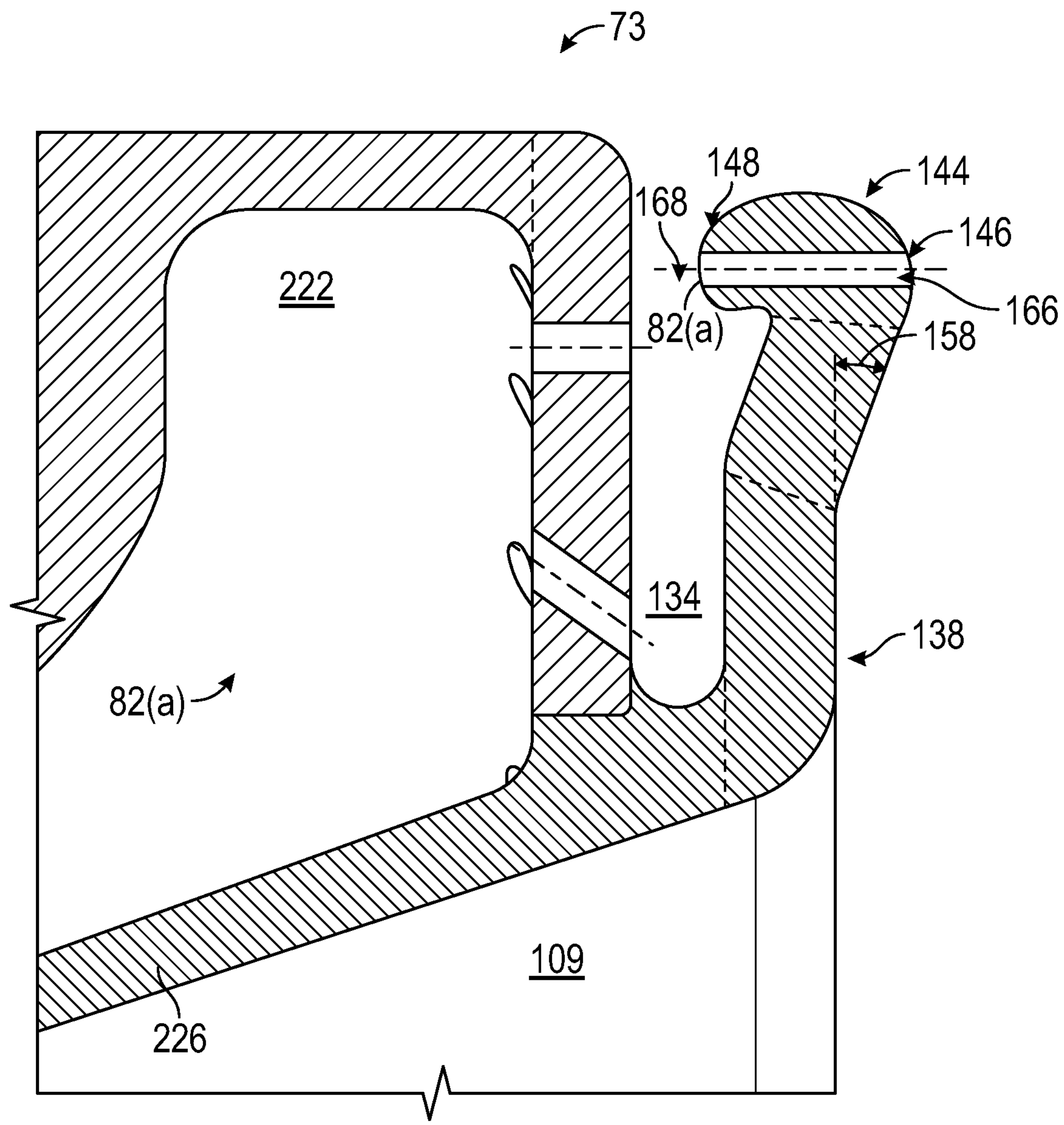
FIG. 11 is a partial cross-sectional side detail view of a portion of a heat shield, taken at detail A-A in FIG. 3, according to yet another aspect of the present disclosure.

FIG. 11 depicts the present aspect of the heat shield formed of the radial flange 138 connected with the annular conical wall 226, with the radial flange including flange tip cooling holes 166, the same as shown and described with regard to FIG. 5. Therefore, the above description with regard to the flange tip cooling holes 166 of FIG. 5 is applicable to FIG. 11 and will not be repeated.

Figure 12:
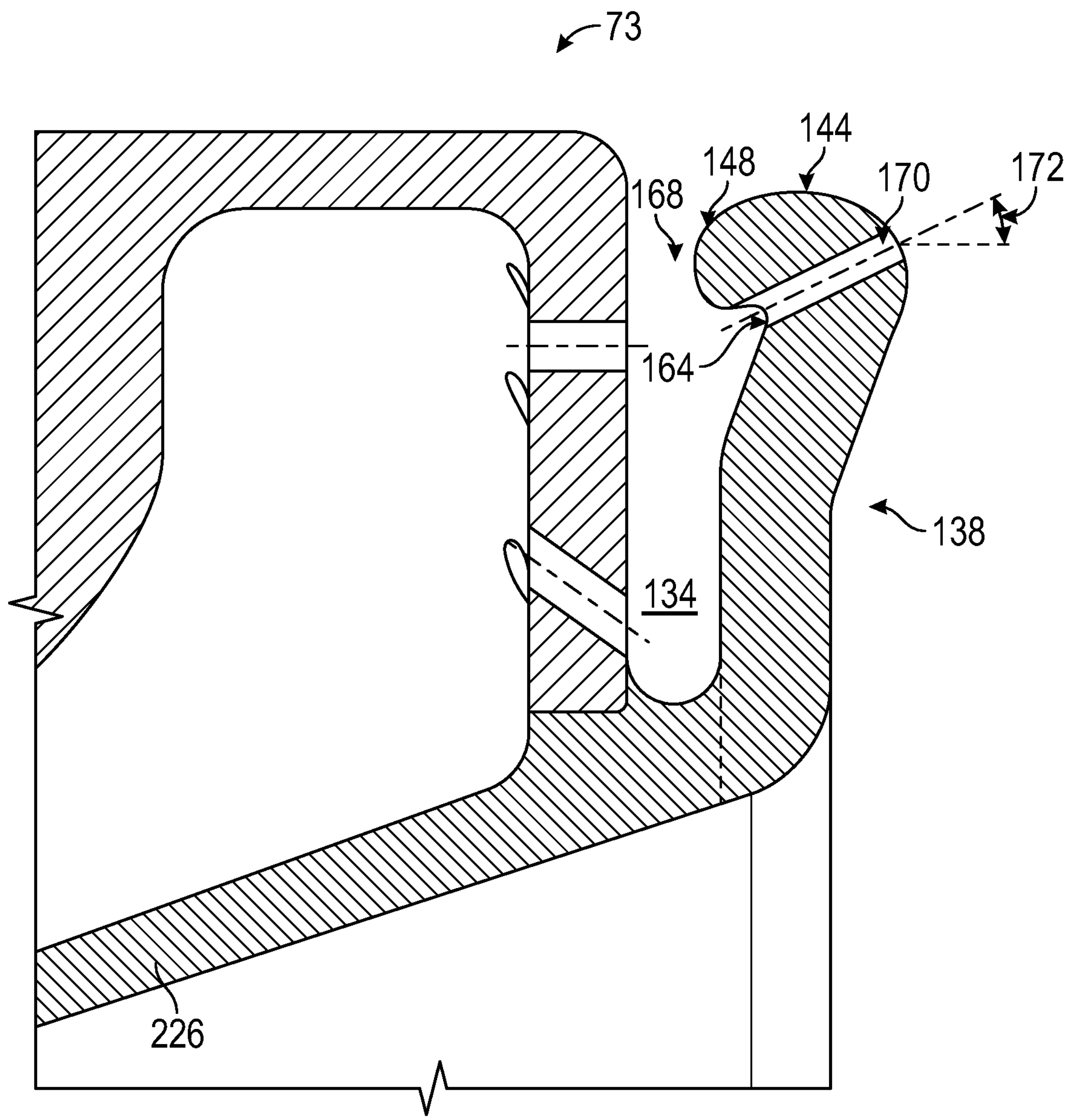
FIG. 12 is a partial cross-sectional side detail view of a portion of a heat shield, taken at detail A-A in FIG. 3, according to still another aspect of the present disclosure.

FIG. 12 depicts the present aspect of the heat shield formed of the radial flange 138 connected with the annular conical wall 226, with the radial flange including flange tip cooling holes 170, the same as shown and described with regard to FIG. 6. Therefore, the above description with regard to the flange tip cooling holes 170 of FIG. 6 is applicable to FIG. 12 and will not be repeated.

Figure 13:
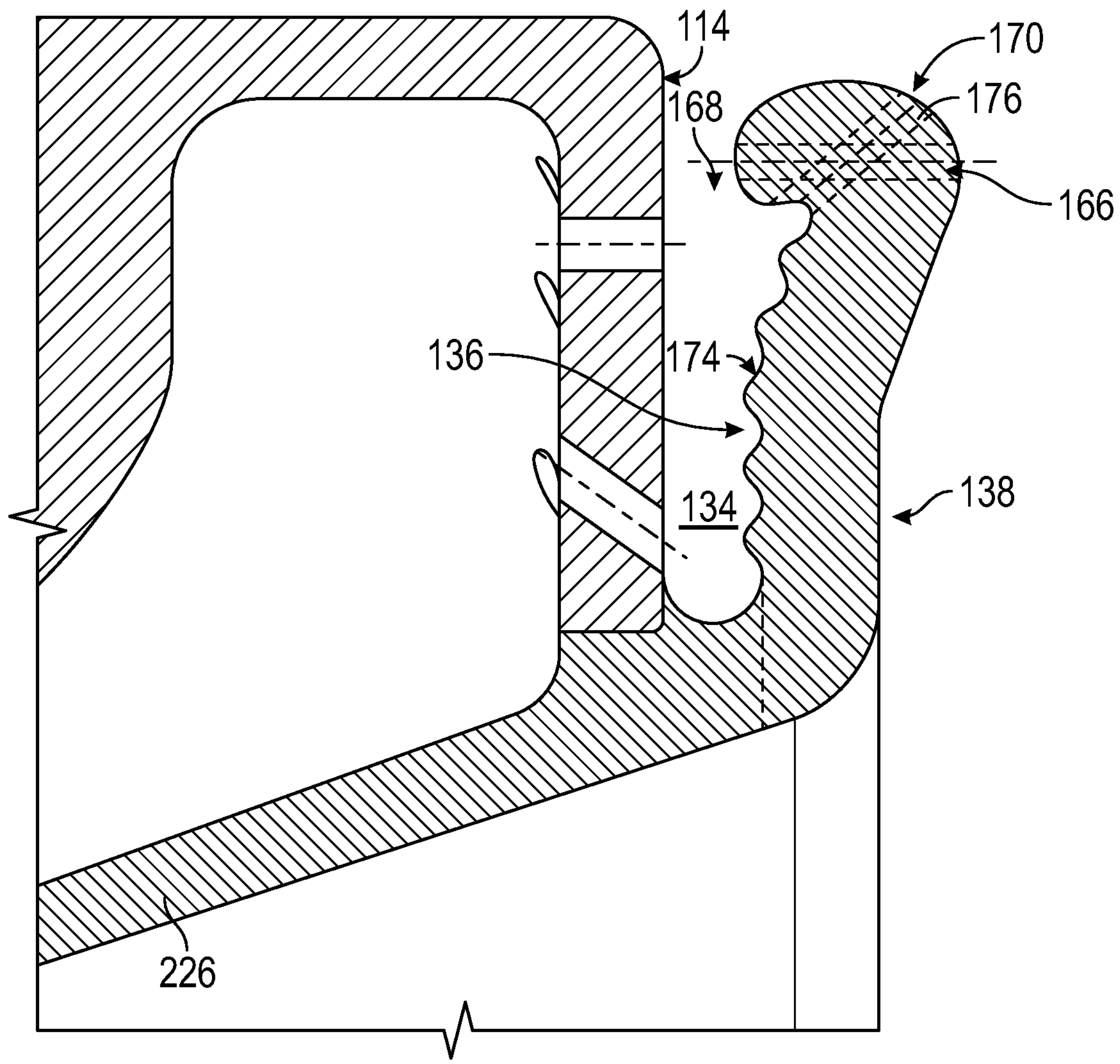
FIG. 13 is a partial cross-sectional side detail view of a portion of a heat shield, taken at detail A-A in FIG. 3, according to yet another aspect of the present disclosure.

FIG. 13 depicts the present aspect of the heat shield formed of the radial flange 138 connected with the annular conical wall 226, with the radial flange including the corrugated surface of the flange forward side 136, and optionally, flange tip cooling holes 166 and/or 170, the same as shown and described with regard to FIG. 7. Therefore, the above description with regard to FIG. 7 is applicable to FIG. 13 and will not be repeated.

Figure 14:
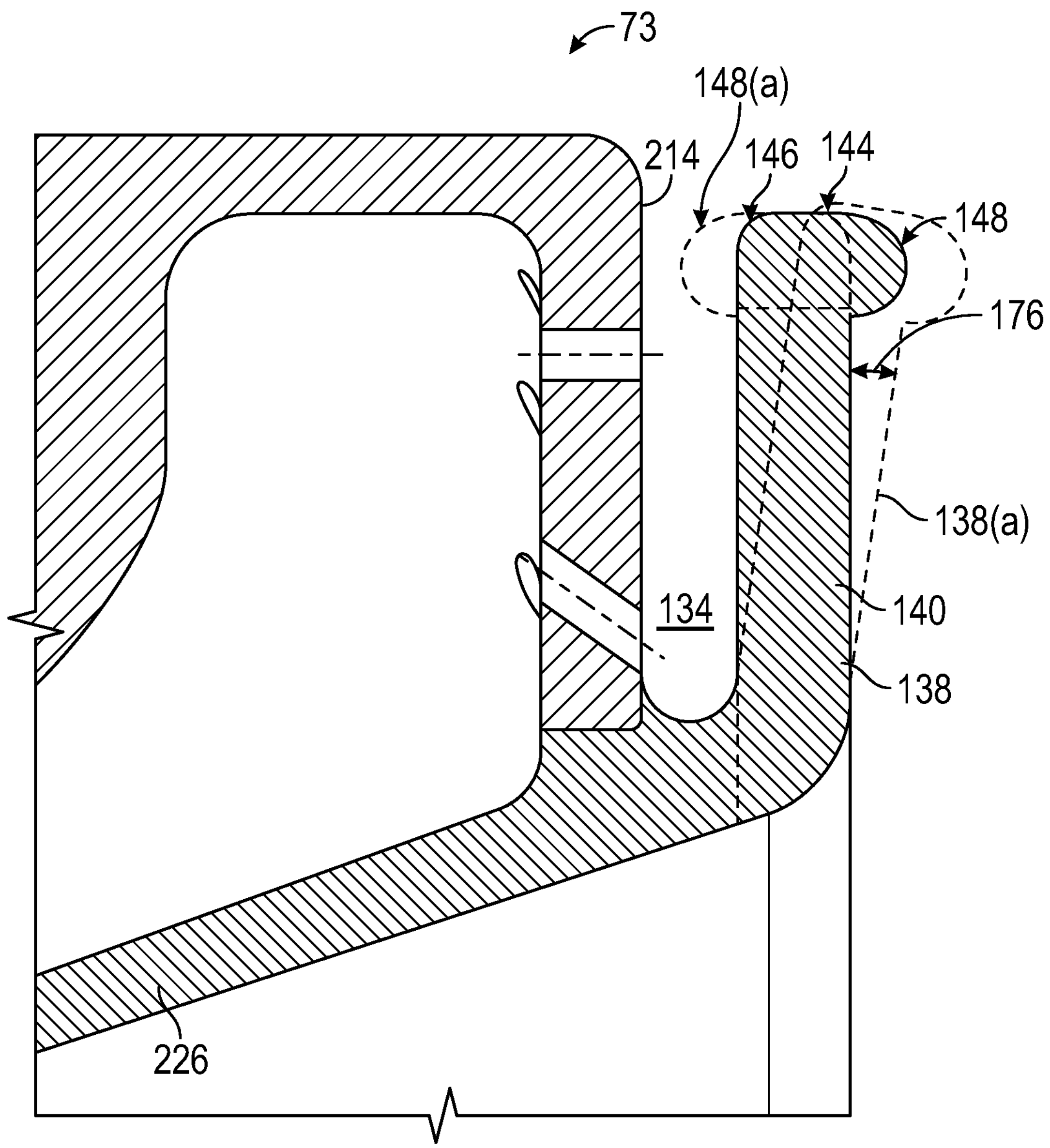
FIG. 14 is a partial cross-sectional side detail view of a portion of a heat shield, taken at detail A-A in FIG. 3, according to still another aspect of the present disclosure.

FIG. 14 depicts the present aspect of the heat shield formed of the radial flange 138 connected with the annular conical wall 226, with the radial flange angled portion 142 being omitted, the same as shown and described with regard to FIG. 8. Therefore, the above description with regard to FIG. 8 is applicable to FIG. 14 and will not be repeated.

While the foregoing description relates generally to a gas turbine engine, it can readily be understood that the gas turbine engine may be implemented in various environments. For example, the engine may be implemented in an aircraft, but may also be implemented in non-aircraft applications such as power generating stations, marine applications, or oil and gas production applications. Thus, the present disclosure is not limited to use in aircraft.

Further aspects of the present disclosure are provided by the subject matter of the following clauses.

A heat shield for a fuel nozzle of a gas turbine engine combustor, the heat shield defining a radial direction, a longitudinal direction along a centerline axis, and a circumferential direction about the centerline axis, the heat shield comprising, a radial flange extending in the radial direction and the circumferential direction, the radial flange having an opening therethrough at a radially inward end of the radial flange, and an annular conical wall extending in the longitudinal direction and the circumferential direction, the annular conical wall being connected to the radial flange at the radially inward end of the radial flange, wherein, the radial flange includes a flange forward side, and a flange aft side, and wherein the radial flange further comprises a flange outer end portion, wherein the flange outer end portion includes a flange rounded end portion on one of the flange forward side or the flange aft side, and a flange rounded protruding lip on the other of the flange forward side or the flange aft side, the flange rounded protruding lip extending in the longitudinal direction.

The heat shield according to any preceding clause, wherein the annular conical wall comprises at least a portion of a fuel nozzle venturi.

The heat shield according to any preceding clause, wherein the radial flange further comprises, a flange inner portion extending radially outward from the radially inward end of the radial flange; and an angled portion disposed between the flange inner portion and the flange outer end portion, the angled portion extending at an angle radially outward and in the longitudinal direction.

The heat shield according to any preceding clause, wherein the angled portion extends radially outward and aft.

The heat shield according to any preceding clause, wherein the flange rounded protruding lip extends from the flange forward side of the radial flange, and the flange rounded end portion is disposed on the flange aft side.

The heat shield according to any preceding clause, wherein the flange outer end portion includes at least one cooling hole therethrough.

The heat shield according to any preceding clause, wherein the flange outer end portion includes at least one cooling hole therethrough, and wherein the at least one cooling hole extends through the flange outer end portion at an angle extending radially outward and aft from a crease of the flange rounded protruding lip where the flange rounded protruding lip intersects the flange forward side, to the flange end portion on the flange aft side.

The heat shield according to any preceding clause, wherein the flange forward side comprises a corrugated surface.

The heat shield according to any preceding clause, further comprising, an annular forward wall extending in the radial direction and the circumferential direction, the annular forward wall being connected to the annular conical wall so as to form a gap between the flange forward side of the radial flange and an aft surface of the annular forward wall.

The heat shield according to any preceding clause, wherein the annular forward wall includes at least one cooling hole therethrough for providing a coolant through the annular forward wall to the gap.

Further aspects of the present disclosure are provided by the subject matter of the following additional clauses.

A fuel nozzle assembly for a gas turbine engine, the fuel nozzle assembly defining a radial direction, a longitudinal direction along a fuel nozzle centerline axis, and a circumferential direction about the fuel nozzle centerline axis, fuel nozzle assembly comprising, a fuel nozzle housing, a fuel nozzle disposed within the fuel nozzle housing, and a heat shield, the heat shield comprising, a radial flange extending in the radial direction and the circumferential direction, the radial flange having an opening therethrough at a radially inward end of the radial flange; and an annular conical wall extending in the longitudinal direction and the circumferential direction, the annular conical wall being connected to the radial flange at the radially inward end of the radial flange, wherein, the radial flange includes a flange forward side, and a flange aft side, and wherein the radial flange further comprises a flange outer end portion, wherein the flange outer end portion includes a flange rounded end portion on one of the flange forward side or the flange aft side, and a flange rounded protruding lip on the other of the flange forward side or the flange aft side, the flange rounded protruding lip extending in the longitudinal direction.

The fuel nozzle assembly according to any preceding clause, wherein the annular conical wall comprises a fuel nozzle venturi.

The fuel nozzle assembly according to any preceding clause, wherein the radial flange further comprises, a flange inner portion extending radially outward from the radially inward end of the radial flange, and an angled portion disposed between the flange inner portion and the flange outer end portion, the angled portion extending at an angle radially outward and in the longitudinal direction.

The fuel nozzle assembly according to any preceding clause, wherein the angled portion extends radially outward and aft.

The fuel nozzle assembly according to any preceding clause, wherein the flange rounded protruding lip extends from the flange forward side of the radial flange, and the flange rounded end portion is disposed on the flange aft side.

The fuel nozzle assembly according to any preceding clause, wherein the fuel nozzle housing includes a fuel nozzle aft radial wall extending in the radial direction and the circumferential direction, the fuel nozzle aft radial wall including a radially inward end thereof connected to the annular conical wall so as to form a gap between the flange forward side and an aft surface of the fuel nozzle aft radial wall.

The fuel nozzle assembly according to any preceding clause, wherein the heat shield further comprises: an annular forward wall extending in the radial direction and the circumferential direction, the annular forward wall being connected to the annular conical wall so as to form a gap between the flange forward side of the radial flange and an aft surface of the annular forward wall, and the annular forward wall being connected to the fuel nozzle housing.

The fuel nozzle assembly according to any preceding clause, wherein the flange outer end portion includes at least one cooling hole therethrough.

The fuel nozzle assembly according to any preceding clause, wherein the flange rounded protruding lip extends from the flange forward side of the radial flange, and the flange rounded end portion is disposed on the flange aft side, and wherein the at least one cooling hole extends through the flange outer end portion at an angle extending radially outward and aft, from a crease of the flange rounded protruding lip where the flange rounded protruding lip intersects the flange forward side, to the flange rounded end portion on the flange aft side.

The fuel nozzle assembly according to any preceding clause, wherein the flange forward side comprises a corrugated surface.

Although the foregoing description is directed to some exemplary embodiments of the present disclosure, it is noted that other variations and modifications will be apparent to those skilled in the art, and may be made without departing from the spirit or scope of the disclosure. Moreover, features described in connection with one embodiment of the present disclosure may be used in conjunction with other embodiments, even if not explicitly stated above.

We claim:

1. A heat shield for a fuel nozzle of a gas turbine combustor, the heat shield defining a radial direction, a longitudinal direction along a centerline axis, and a circumferential direction about the centerline axis, the heat shield comprising:

a radial flange extending in the radial direction and the circumferential direction, the radial flange having a fuel nozzle opening extending therethrough at a radially inward end of the radial flange; and an annular conical wall extending in the longitudinal direction and the circumferential direction, the annular conical wall forming a connection to the radial flange at the radially inward end of the radial flange, wherein, the radial flange includes a flange forward side with a flange forward face, and a flange aft side with a flange aft face, and wherein the radial flange further comprises (a) a flange inner portion extending radially outward from the radially inward end of the radial flange to an outer end of the flange inner portion, the flange inner portion extending longitudinally between a part of the flange forward face and a part of the flange aft face where both the part of the flange forward face and the part of the flange aft face extend radially to the outer end of the flange inner portion and both are parallel to the radial direction, the outer end of the flange inner portion being arranged radially outward of the connection of the annular conical wall and the radially inward end of the radial flange, (b) a flange angled portion extending at an angle radially outward and longitudinally aft from the outer end of the flange inner portion to an outer end of the flange angled portion, and (c) a flange outer end portion arranged at the outer end of the flange angled portion, wherein the flange outer end portion includes a flange rounded end portion on one of the flange forward side or the flange aft side, and a flange rounded protruding lip on the other of the flange forward side or the flange aft side, the flange rounded protruding lip extending in the longitudinal direction.

2. The heat shield according to claim 1, wherein the annular conical wall comprises at least a portion of a fuel nozzle venturi.

3. The heat shield according to claim 1, wherein the flange rounded protruding lip extends from the flange forward side of the radial flange, and the flange rounded end portion is disposed on the flange aft side.

4. The heat shield according to claim 1, wherein the flange outer end portion includes at least one cooling hole therethrough.

5. The heat shield according to claim 3, wherein the flange outer end portion includes at least one cooling hole therethrough, and wherein the at least one cooling hole extends through the flange outer end portion at an angle extending radially outward and aft from a crease of the flange rounded protruding lip where the flange rounded protruding lip intersects the flange forward side, to the flange outer end portion on the flange aft side.

6. The heat shield according to claim 1, wherein the flange forward side comprises a corrugated surface.

7. The heat shield according to claim 1, further comprising:

an annular forward wall extending in the radial direction and the circumferential direction, the annular forward wall being connected to the annular conical wall so as to form a gap between the flange forward side of the radial flange and an aft surface of the annular forward wall.

8. The heat shield according to claim 7, wherein the annular forward wall includes at least one cooling hole therethrough for providing a cooling air flow through the annular forward wall to the gap.

9. A fuel nozzle assembly for a gas turbine, the fuel nozzle assembly defining a radial direction, a longitudinal direction along a fuel nozzle centerline axis, and a circumferential direction about the fuel nozzle centerline axis, the fuel nozzle assembly comprising:

a fuel nozzle housing;

a fuel nozzle disposed within the fuel nozzle housing; and a heat shield, the heat shield comprising:

a radial flange extending in the radial direction and the circumferential direction, the radial flange having a fuel nozzle opening extending therethrough at a radially inward end of the radial flange; and an annular conical wall extending in the longitudinal direction and the circumferential direction, the annular conical wall forming a connection to the radial flange at the radially inward end of the radial flange, wherein, the radial flange includes a flange forward side with a flange forward face, and a flange aft side with a flange aft face, and wherein the radial flange further comprises (a) a flange inner portion extending radially outward from the radially inward end of the radial flange to an outer end of the flange inner portion, the flange inner portion extending longitudinally between a part of the flange forward face and a part of the flange aft face where both the part of the flange forward face and the part of the flange aft face extend radially to the outer end of the flange inner portion and both are parallel to the radial direction, the outer end of the flange inner portion being arranged radially outward of the connection of the annular conical wall and the radially inward end of the radial flange, (b) a flange angled portion extending at an angle radially outward and longitudinally aft from the outer end of the flange inner portion to an outer end of the flange angled portion, and (c) a flange outer end portion arranged at the outer end of the flange angled portion, wherein the flange outer end portion includes a flange rounded end portion on one of the flange forward side or the flange aft side, and a flange rounded protruding lip on the other of the flange forward side or the flange aft side, the flange rounded protruding lip extending in the longitudinal direction.

10. The fuel nozzle assembly according to claim 9, wherein the annular conical wall comprises a fuel nozzle venturi.

11. The fuel nozzle assembly according to claim 9, wherein the flange rounded protruding lip extends from the flange forward side of the radial flange, and the flange rounded end portion is disposed on the flange aft side.

12. The fuel nozzle assembly according to claim 9, wherein the fuel nozzle housing includes a fuel nozzle aft radial wall extending in the radial direction and the circumferential direction, the fuel nozzle aft radial wall including a radially inward end thereof connected to the annular conical wall so as to form a gap between the flange forward side and an aft surface of the fuel nozzle aft radial wall.

13. The fuel nozzle assembly according to claim 9, wherein the heat shield further comprises:

an annular forward wall extending in the radial direction and the circumferential direction, the annular forward wall being connected to the annular conical wall so as to form a gap between the flange forward side of the radial flange and an aft surface of the annular forward wall, and the annular forward wall being connected to the fuel nozzle housing.

14. The fuel nozzle assembly according to claim 9, wherein the flange outer end portion includes at least one cooling hole therethrough.

15. The fuel nozzle assembly according to claim 14, wherein the flange rounded protruding lip extends from the flange forward side of the radial flange, and the flange rounded end portion is disposed on the flange aft side, and wherein the at least one cooling hole extends through the flange outer end portion at an angle extending radially outward and aft, from a crease of the flange rounded protruding lip where the flange rounded protruding lip intersects the flange forward side, to the flange rounded end portion on the flange aft side.

16. The fuel nozzle assembly according to claim 9, wherein the flange forward side comprises a corrugated surface.

* * * * *